July 31, 1956  R. E. KEITH  2,756,533
FISHING LURE
Filed July 11, 1955
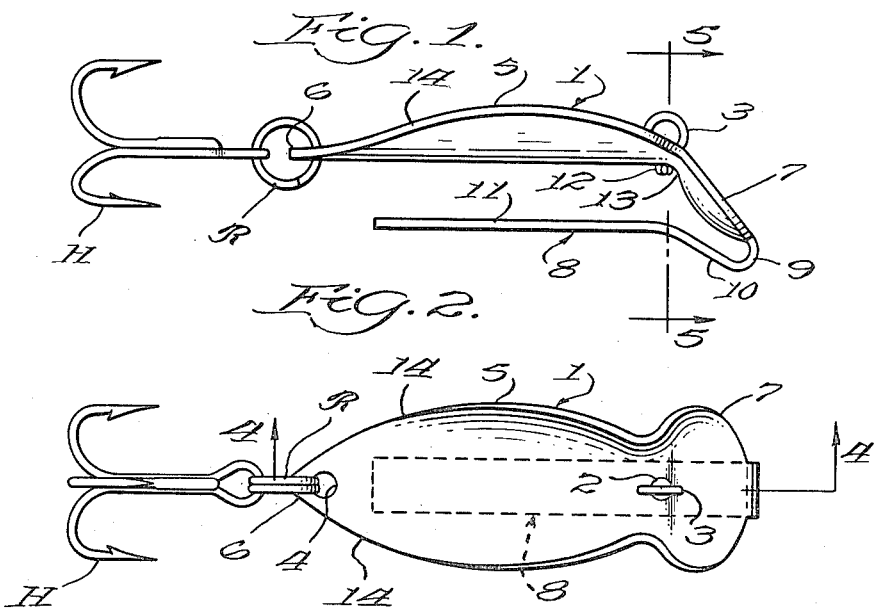
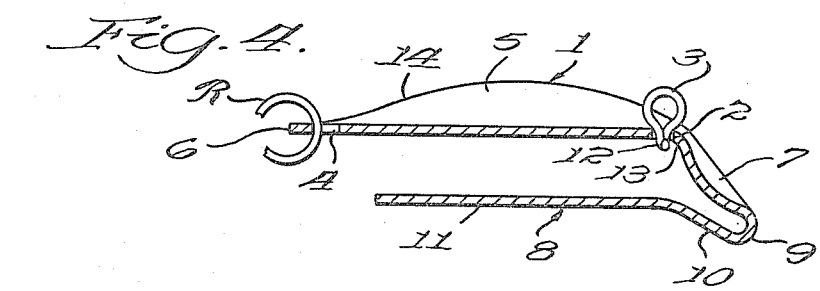
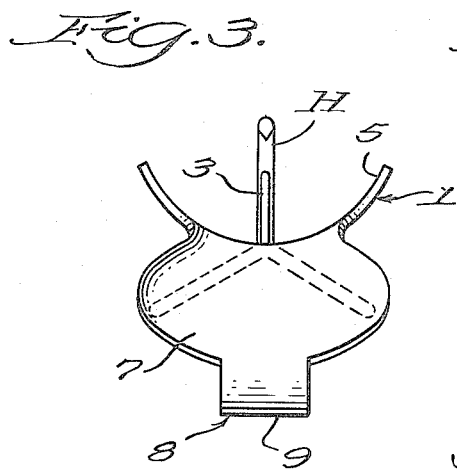
INVENTOR.
Raymond E. Keith.
BY
Harold J. LeVescounte
Atty.

United States Patent Office 2,756,533
Patented July 31, 1956

2,756,533

FISHING LURE

Raymond E. Keith, San Fernando, Calif.

Application July 11, 1955, Serial No. 520,982

4 Claims. (Cl. 43—42.5)

This invention relates to fishing lures and more particularly to an improved form thereof having an action which through manipulation of the line to which it is attached can be made to perform varied types of movement in simulation of live bait.

The principal object of the invention is to provide a fishing lure formed principally from a sheet metal stamping having a configuration which when drawn through the water partakes of controllable, seemingly erratic movements in simulation of the action of live bait.

Another object of the invention is to provide a fishing lure of the above character which is of a design susceptible of economical manufacture and which is sufficiently sturdy to assure freedom from damage incident to use.

A further object of the invention is to provide a fishing lure formed of resilient metal and which is characterized by a yielding vane element which upon being contacted by a striking fish yields to insure engagement of the fish with the fish hooks associated with the lure.

With the foregoing objects in view, together with such additional objects and advantages as may subsequently appear, the invention resides in the parts, and in the construction, configuration and arrangement of parts disclosed, by way of example, in the following specification of a presently preferred embodiment of the invention; reference being had to the accompanying drawings which form a part of said specification and in which drawings:

Fig. 1 is a side elevational view of a fishing lure embodying the present invention, Fig. 2 is a top plan view of the lure shown in Fig. 1, Fig. 3 is a front end elevational view as seen from the right hand end of Fig. 1, Fig. 4 is a medial longitudinal sectional view taken on the line 4—4 of Fig. 2, and Fig. 5 is a transverse sectional view taken on the line 5—5 of Fig. 1.

The lure comprises a body 1 formed from a single strip of resilient sheet metal having a first hole 2 formed therein along the longitudinal medial line thereof adjacent the front end of the body in which an eyelet 3 is mounted for connection with the fishing line or leader. Adjacent the opposite end the body is provided with a second hole 4 also located along the said medial line for attachment of a suitable hook H by any suitable means such as the common helical spring ring connector R.

The body 1 is formed from a flat sheet metal blank including a first portion 5 of generally oval configuration in plan but terminating in a point 6 adjacent the hole 4; said first portion being also bent transversely into partially circular form about an axis extending parallel to the length of the blank. At its end opposite to the point 6, the portion 5 merges into a mid-portion 7 of generally circular configuration in plan except for the portion which merges into the portion 5; said mid-portion being bent into concavo-convex form with the convex side thereof on the same surface as the convex surface of the portion 5; said mid-portion, further being disposed at about a forty-five degree angle with respect to the longitudinal medial line of the portion 5 and extending forwardly and downwardly with respect to said first portion when the body member is in the position shown in Fig. 1. The body member further includes a vane portion 8 comprising a narrow strip of uniform width extending from the lower end of the mid-portion 7 in a return bend 9 leading into a run 10 extending generally parallel to the plane of the mid-portion 7 and adjacent to the convex surface thereof and thence into a run 11 extending parallel to and spaced from the longitudinal medial portion of the convex side of the first portion 5 of the body member and terminating at a point spaced from the axial line of the hole 4. Referring to Figs. 1 and 4, it will be noted that the hole 2 is located adjacent the juncture of the portions 5 and 7 and that the eyelet 3 comprises a loop of wire having the limbs 12, 12 thereof projected through the hole 2 to the convex side of the body member and bent in opposite directions transversely of the body member. As these limbs are thus disposed adjacent the bend 13 in the body member they serve not only to hold the eyelet 3 positioned in the hole, but also serve to hold it against any twisting movement.

When the lure is pulled rapidly through the water at a constant rate of speed, the inclined front face comprising the mid-portion 7 will tend to cause the lure to descend and this tendency will be resisted by the relative angle upwardly and forwardly of the line. The concave front surface of the portion 7 causes the lure to waver from side to side in an erratic manner and variations in the rate of pull on the line such as by short jerking actions on the rod will further increase this action. By practice, the angler can develop his own technique of effective modes of retrieving the lure with resultant variations of the type of action of the lure in the water. The vane portion 8 in some manner not understood adds materially to the sensitiveness of the lure to variations in the action thereof derived from modes of retrieving thereof as above explained and being resilient, it yields readily to the bite of a fish and combines with the sloping edges 14, 14 of the portion 5 to provide a sloping surface that can be readily pulled out of the mouth of a fish in responding to a strike and the hooking of the fish.

While the foregoing specification and drawings disclose a presently preferred mode of execution of the invention, it is not to be inferred therefrom that the invention is limited to the exact form so disclosed, and it will be understood that the invention embraces all such changes and modifications as shall come within the purview of the appended claims.

I claim:

1. A fishing lure comprising a body member formed from a single piece of resilient sheet metal; said body member comprising a first portion of elongated, substantially oval configuration in plan and being bent transversely about a medially longitudinally extending axial line to provide a concavo-convex configuration and so that the widest part of said first portion forms slightly less than a half circle, means for attaching a fish hook to the rear end of said first portion, a mid-portion of substantially circular configuration in plan forming an extension of the front end of said first portion; said mid-portion being of concavo-convex configuration in cross section and the convex face thereof being formed on the same surface of the sheet metal as the convex side of said first portion and said mid-portion being disposed at an acute angle extending away from the axial line about which said first portion is bent, and a vane portion comprising a strip of uniform width extending from the side of said mid-portion opposite the juncture of said first portion and said mid-portion in a return bend, thence extending in a run disposed substantially parallel to and spaced from the plane of said mid-portion and thence extending in a second run disposed parallel to and spaced from the longitudinal medial line of said first portion, and means for attaching said body member to a fish line.

2. A fishing lure as claimed in claim 1 in which said line attaching means comprises an eyelet disposed at the concave side of said first portion and adjacent the juncture thereof with said mid-portion.

3. A fishing lure as claimed in claim 1 in which said first portion is formed with a hole extending therethrough along the medial longitudinal line thereof and adjacent to the juncture of said first portion and said mid-portion, said line attaching means comprising an eyelet formed of wire bent on itself into a loop disposed on the concave face of said first portion and having the free ends of said wire extending through said hole and bent transversely of said body member to position the free ends along the juncture of said first portion and said mid-portion with resultant anchoring of said eyelet in said hole against removal therefrom and against turning therein.

4. A fishing lure including a body formed of resilient sheet metal and comprising a first portion of elongated form and of modified U-shape in transverse cross section, means for attaching a fish hook to one end of said first portion, a concavo-convex mid-portion extending from the opposite end of said first portion and having its plane disposed at an acute angle with respect to the longitudinal medial line of said first portion and a vane portion extending from the side of said mid-portion opposite the juncture thereof with said first portion in a return bend, thence extending in a run disposed substantially parallel to and spaced from the plane of said mid-portion and thence extending in a second run disposed parallel to and spaced from the longitudinal medial line of said first portion, and means for attaching said body member to a fish line.

References Cited in the file of this patent

UNITED STATES PATENTS

| | | |
|---|---|---|
| 2,527,064 | Hufnagel | Oct. 24, 1950 |
| 2,733,534 | Mallory | Feb. 7, 1956 |